Jan. 13, 1953  H. O. WILCOX ET AL  2,624,973
SNELLED FISHHOOK HOLDER
Filed May 11, 1949

INVENTORS
Henry O. Wilcox,
John C. Raymond &
Aldrid N. Opheim
BY
Lamphere and Van Valkenburgh
ATTORNEYS Patented Jan. 13, 1953

2,624,973

UNITED STATES PATENT OFFICE 2,624,973

SNELLED FISHHOOK HOLDER

Henry O. Wilcox, John C. Raymond, and Aldrid N. Opheim, Denver, Colo.

Application May 11, 1949, Serial No. 92,596

10 Claims. (Cl. 43—57.5)

This invention relates to holders for fish hooks and more particularly to a holder for fish hooks which are provided with a snell.

One of the objects of our invention is to produce an improved holder for snelled fish hooks which can be conveniently carried in a bag or pocket without possibility of snagging the hooks.

A further object is to produce a holder for snelled fish hooks which is so constructed that the entire hook will be protected from engagement, thus permitting the carrying of any type of hook, including those provided with barbed shanks, without any possibility of snagging.

A still further object is to produce an improved holder for snelled fish hooks which will permit the holding of hooks having different snell lengths, yet will be of a size that it can be conveniently carried in a coat or shirt pocket.

Yet a further object is to produce an improved holder for snelled hooks in which spring tensioned means, employed for maintaining the snell taut, is so associated with the holder that it will permit the holder to have minimum length for pocket carrying.

Another object is to so design a holder for snelled fish hooks that it can be made from moldable material such as plastic.

A further object is to produce a fish hook holder of the type referred to which will be efficient in its holding function, will permit easy mounting and removal of hooks, and will be economical to manufacture.

Other objects of the invention will become apparent from the following description taken in connection with the accompanying drawings in which.

Figure 1:
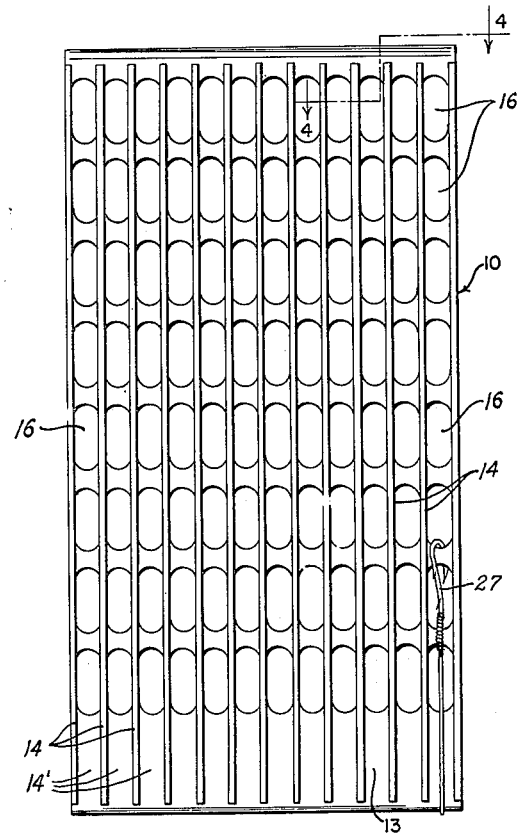
Figure 1 is a front view of a fish hook holder embodying our invention.
Figure 2:
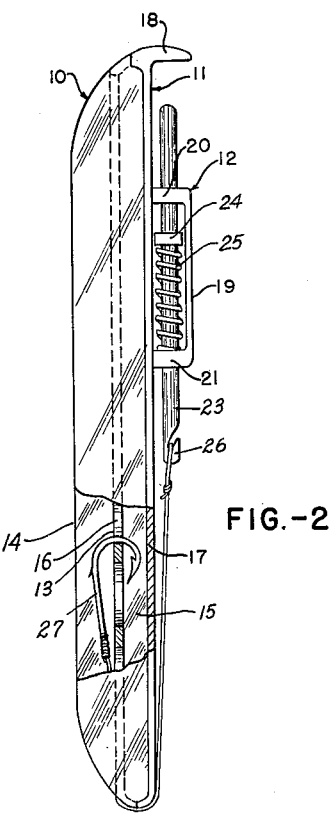
Figure 2 is a side view of the holder.
Figure 3:
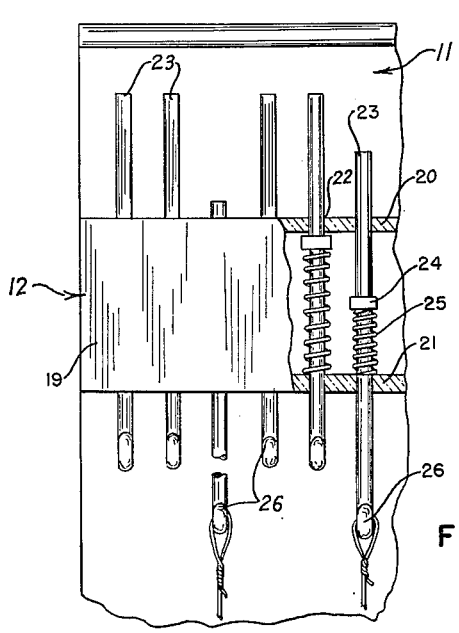
Figure 3 is a view of a portion of the back side of the holder showing the mounting of the spring biased plungers, said view having parts broken away to disclose details.
Figure 4:
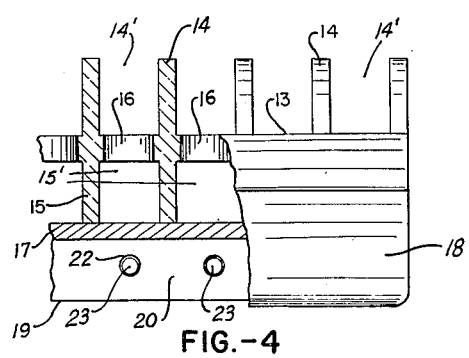
Figure 4 is a partial top and sectional view, said view being taken on the line 4—4 of Figure 1.

Referring to the drawings in detail, our improved holder is constructed of three units comprising a body 10, a back 11 and a tensioning unit 12.

The body 10 has a rectangular shape with a main plate 13. On the front side of this plate are parallel, longitudinally extending walls 14 arranged to be at right angles to the plate. These walls thus define parallel channels or troughs 14'. The ends of the walls are curved, as shown, from their top edge to the plate so as to eliminate sharp corners. On the back side of the plate 13 there is also provided parallel, longitudinally extending walls 15 forming channels or troughs 15', there being a wall 15 directly opposite each front wall 14. In the plate 13 between the walls are a plurality of oblong fish hook receiving holes 16. These holes are arranged to be in parallel rows extending across the plate. The entire plate is shown as being provided with these holes, but a fewer number of parallel rows can be employed if desired. The plate 13 and walls 14 and 15 are preferably constructed integrally, but they may be separate pieces suitably secured together.

The back 11 is in the form of a sheet 17 having at its upper end a rearwardly extending protecting ledge or flange 18. The back has the same size as the body and is secured to the outer edges of the rearwardly extending walls 15 on the body. Thus the channels or troughs 15' formed by the walls 15 will be closed and protected. The ends of the plate 13 of the body and the ends of the back sheet are suitably formed so as to provide smooth joints having curved surfaces, as shown, in order to eliminate sharp corners.

The tensioning unit 12 is mounted on the rear surface of the back adjacent its upper end below the protecting ledge or flange 18. This unit comprises a housing 19 of U-shaped cross section extending laterally across the back 11. The flanges 20 and 21 forming the legs of the housing are directly secured in a suitable manner to the rear surface of the back. These flanges 20 and 21 are provided with aligned guide holes 22 in which are mounted reciprocable plungers 23. The number of plungers will correspond to the number of channels or troughs 14' formed by walls 14 on the plate of the body 10 with a plunger mounted directly behind each trough. Each plunger between the legs 20 and 21 has secured thereto a square block 24 acting as an abutment to engage the upper leg 20 to limit the upward movement of the plunger and also as an abutment for a coil spring 25 surrounding the plunger and interposed between the block and the lower leg 21 of the housing. The plungers are of sufficient length to extend from opposite sides of housing 19. On the lower end of each is a hook 26 to which the loop end of a snell can be connected.

We prefer to make all the parts of the holder, with the exception of the springs, from a plastic material. The body 10 can thus be molded as a single piece, as can also the back. The housing 19 of the tensioning unit can be molded as a single piece and after assembling the plungers, blocks and springs, it can be attached to the rear surface of the back. The plungers and blocks can be of plastic material. By molding the parts there is created an attractive appearance and if desired different colored plastic material can be used for the various parts.

With our improved fish hook holder constructed as described, snelled hooks, such as the one shown in the drawings and indicated by the numeral 27, can be mounted so they will be firmly held with the snell in a taut condition. Each hook will be placed in a channel or trough 14′ between walls 14 and its end inserted through an oblong opening so as to hook onto the plate at the bottom of the opening. The snell is then brought down around the lower end of the holder and up the rear side of the back where the looped end can be hooked onto the hook of the plunger which is directly back of the trough in which the fish hook is mounted. To attach the looped end to a plunger, the plunger will be pressed downwardly to make the connection and then released. This will pull the snell taut and hold the fish hook. In mounting, a fish hook will be placed in an oblong hole which will be so located that when the snell loop is brought around to the back side, the loop will be just short of reaching the end of a plunger. Then when the plunger is pressed downwardly its hook end can be inserted in the snell loop and upon release the snell will be held taut by the action of the spring.

It will be noted that with our improved fish hook holder the fish hook will be fully protected so it cannot become snagged on any object. The fish hook point is covered by the back sheet 17. The shank of the fish hook will lie wholly within a trough 14′ formed by walls 14. Thus, if the shank is barbed, the barbs cannot become engaged with any cloth or other material that may come adjacent the front side of the holder. If snelled fly hooks are mounted, the walls 14 will protect the hackles and other material from damage. It is also to be noted that the upper ends of the plungers will be protected by the ledge or flange 18 so they will not be accidently depressed to release a snell. There is room, however, to insert a thumb or finger below the flange to operate a plunger. The square blocks on the plungers prevent the plungers from turning, thus the hooked end will always be in proper position for easily attaching the loop end of a snell. The holder will permit mounting of fish hooks having different lengths of snells. It is further to be noted that the construction of the holder is such it can be carried in a pocket of a garment or in a creel without any danger of snagging a fish hook as the entire hook is protected. Further, because of the mounting of the tensioning unit on the upper end of the rear side, the holder is of such short length that it can fit easily into a pocket without any large portion protruding. The rounded end and curved surfaces permit its sliding into and out of garment pockets, particularly shirt pockets. Fish hooks are easily and quickly mounted and removed. Due to the back side walls 15 on the plate of the body, the pointed ends of the fish hooks will always be maintained in a separated condition.

Being aware of the possibility of modification in the particular holder construction shown and described by way of example without departing from the fundamental principles of our invention, it is to be understood that the scope of our invention is not to be limited in any manner except as set forth by the structure or its equivalent called for in the appended claims.

What is claimed is:

1. In a holder for snelled fish hooks, a body member having spaced walls extending outwardly therefrom with hook receiving openings in the body member between the walls, and spring actuated means carried at the rear of the body member and to which a snell of a hook can be attached and maintained taut when the hook is attached by means of one of said openings and the snell passed around the end of the body member.

2. In a holder for snelled fish hooks, a body member having spaced outwardly extending walls defining a channel, means between the walls at the base of the channel for engagement by a fish hook and when engaged to lie entirely below the top of the walls, and spring actuated means carried by the body member to which the free end of a snell of the hook can be attached and maintained taut.

3. In a holder for snelled fish hooks, a body member having spaced longitudinal walls extending outwardly therefrom with hook receiving openings in the body member between the walls, and means carried by the body member to which a snell of a hook can be attached and maintained taut, said walls being of a height to extend above the hook when positioned in an opening.

4. In a holder for snelled fish hooks, a body member having spaced longitudinal walls extending outwardly therefrom with hook receiving openings in the body member between the walls, a back sheet on the side of the body member opposite the walls and in spaced relation to the openings, and means carried by the back sheet to which a snell of a hook can be attached and maintained taut, said walls being of a height to extend above the hook when positioned in an opening.

5. In a holder for snelled fish hooks, a body member having openings for providing means for engagement by the hooks of snelled hooks when placed in the openings, a back sheet carried by the body member in spaced relation thereto to provide a protecting wall for the pointed ends of the hooks, and spring biased means mounted on the back sheet and to which loops of the snells can be attached and held taut when the snells are passed around one end of the body member.

6. In a holder for snelled fish hooks, a body member having outwardly extending spaced longitudinal walls on the front side thereof providing channels, said body member having openings therein at the bottoms of the channels providing means for engagement by the hooks when placed in the openings, a back sheet on the body member mounted in spaced relation thereto, and spring biased plungers having hook ends mounted on the back sheet and to which the loops of the snells of the snelled hooks can be attached and held taut when the snells are extended around the one end of the body member, said holder also being provided with a rearwardly extending ledge overlying and protecting the plunger means.

7. In a holder for snelled fish hooks, a body member having outwardly extending spaced longitudinal walls on one side thereof providing channels, said walls having ends with curved edges meeting the body portion from which the walls extend, said body member having openings therein at the bottoms of the channels providing means for engagement by the hooks when placed in the openings, and spring biased means mounted on the other side of the body member to which the loop ends of snelled hooks can be attached and have their snells maintained taut, the height of said walls being such that the hook when mounted will lie below the outer edges.

8. In a holder for snelled fish hooks, a body member having on one side thereof longitudinally extending walls defining channels and being provided between the walls with hook receiving openings, a back sheet attached in spaced relation to the rear side of the body member, and spring biased plungers mounted on the outer surface of the back sheet and provided with hooks to each of which a loop end of snell can be attached and the snell held taut when a hook is engaged with the wall of one of said openings and its snell passed around the end of the body member.

9. In a holder for snelled fish hooks, a body member having on each side thereof longitudinalnally extending walls defining opposed channels on the front and rear sides of the body member and being provided between the walls with hook receiving slots, a back sheet attached to the rear side walls to close the channels, and spring biased plungers mounted on the outer surface of the back sheet and provided with hooks to each of which a loop end of snell can be attached and the snell held taut when a hook is engaged with the wall of one of said slots and its snell passed around the end of the body member.

10. In a holder for snelled fish hooks, a body member provided with means with which a hook of a snelled hook can be engaged, and means carried by the body to which the loop end of the snell can be attached and the snell held taut, said last named means comprising spaced members carried by the body member and extending laterally therefrom, a cylindrical plunger reciprocably mounted in the spaced members and provided with a hook to which the loop can be attached, a coil spring surrounding the plunger between and engageable at one end with one of the spaced members, and an abutment block fixed on the plunger between the spaced members and engageable by the other end of the coil spring, said abutment block having a flat surface slidably cooperating with a surface carried by the body member for preventing rotation of the plunger.

HENRY O. WILCOX.
JOHN C. RAYMOND.
ALDRID N. OPHEIM.

REFERENCES CITED

The following references are of record in the file of this patent:

UNITED STATES PATENTS

| Number | Name | Date |
|---|---|---|
| 549,970 | Lawrence | Nov. 19, 1895 |
| 1,451,256 | Gardener | Apr. 10, 1923 |
| 1,715,567 | Porter | June 4, 1929 |
| 1,737,376 | Knettles | Nov. 26, 1929 |
| 2,041,231 | Collins | May 19, 1936 |
| 2,080,794 | Squassoni | May 18, 1937 |
| 2,208,649 | Strom | July 23, 1940 |

FOREIGN PATENTS

| Number | Country | Date |
|---|---|---|
| 27,109 | Great Britain | 1897 |
| 45,008 | Norway | Mar. 1, 1927 |
| 249,069 | Switzerland | Apr. 1, 1948 |